US009360029B2

(12) United States Patent
Wallace (10) Patent No.: US 9,360,029 B2
(45) Date of Patent: Jun. 7, 2016

(54) FRICTIONAL COUPLING

(71) Applicant: The Boeing Company, Chicago, IL (US)

(72) Inventor: Steven Wallace, University Place, WA (US)

(73) Assignee: THE BOEING COMPANY, Chicago, IL (US)

( * ) Notice: Subject to any disclaimer, the term of this patent is extended or adjusted under 35 U.S.C. 154(b) by 399 days.

(21) Appl. No.: 13/782,773

(22) Filed: Mar. 1, 2013

(65) Prior Publication Data

US 2014/0245584 A1   Sep. 4, 2014

(51) Int. Cl.
*A44B 18/00* (2006.01)
*F16B 2/00* (2006.01)
*F16D 1/08* (2006.01)

(52) U.S. Cl.
CPC ............... *F16B 2/00* (2013.01); *F16D 1/0858* (2013.01); *F16D 2300/10* (2013.01); *Y10T 29/49826* (2015.01); *Y10T 403/74* (2015.01)

(58) Field of Classification Search
CPC ............... A44B 18/00; A44B 18/0007; A44B 18/0015; A44B 18/0053; A44B 18/0061; Y10T 24/2792; Y10T 24/2708; Y10T 24/27; Y10T 428/24355; Y10T 428/24182; Y10T 428/24479
See application file for complete search history.

(56) References Cited

U.S. PATENT DOCUMENTS

| 5,158,557 | A | * | 10/1992 | Noreen et al. ............... 604/389 |
| 5,657,516 | A | * | 8/1997 | Berg et al. ..................... 24/452 |
| 6,872,439 | B2 | * | 3/2005 | Fearing et al. .................. 428/99 |
| 7,141,283 | B2 | * | 11/2006 | Janzen et al. ................. 428/36.9 |
| 7,780,810 | B2 | * | 8/2010 | Hamano ........................ 156/247 |
| 8,206,631 | B1 | * | 6/2012 | Sitti et al. ....................... 264/255 |
| 8,703,032 | B2 | * | 4/2014 | Menon et al. .................. 264/227 |
| 2005/0148984 | A1 | * | 7/2005 | Lindsay et al. ............... 604/387 |
| 2005/0224975 | A1 | * | 10/2005 | Basavanhally et al. ....... 257/741 |
| 2006/0005362 | A1 | * | 1/2006 | Arzt et al. ....................... 24/442 |
| 2006/0202355 | A1 | * | 9/2006 | Majidi et al. .................. 257/783 |
| 2011/0016675 | A1 | * | 1/2011 | Mayers et al. .................. 24/450 |
| 2012/0315082 | A1 | * | 12/2012 | Linzell .......................... 403/270 |

OTHER PUBLICATIONS

Kramer, R.K. et al., "Shear-Mode Contact Splitting for a Microtextured Elastomer Film," *Advanced Materials*, 22, pp. 3700-3703 (Sep. 2010).
Zhang, Q.S. et al., "Development and characterization of a novel piezoelectric-driven stick-slip actuator with anisotropic-friction surfaces," *Int. J. Adv. Manuf. Techol.*, 6 pages (Dec. 9, 2011).
Hancock, M.J. et al., "Bioinspired Directional Surfaces for Adhesion, Wetting, and Transport," *Advanced Functional Materials*, 12 pages (2012).

\* cited by examiner

*Primary Examiner* — Daniel Wiley
(74) *Attorney, Agent, or Firm* — Thompson Hine LLP (57) ABSTRACT

A coupling between a first surface and a second surface is disclosed. The first surface includes a first shape and has a surface roughness average that is less than or equal to about 500 microinches (13 microns). The second surface includes a second shape and projections, in a preselected pattern, forming at least a portion of the second surface. The first shape of the first surface and the second shape of the second surface are substantially complementary. The projections are configured to produce a friction fit between the first surface and the second surface when the first and the second surfaces are biased against each other. An average elastic compressive range, substantially equal to the surface roughness average of the first surface, is associated with the projections.

35 Claims, 4 Drawing Sheets

FRICTIONAL COUPLING

FIELD

The disclosure relates to mechanical couplings and, more particularly, to frictional couplings.

BACKGROUND

There are many types of mechanical couplings between parts. In one variety, a first part is retained within a second part. In one form, the first part may be a tool and the second part may be a tool holder. In another form, the first part may be a retaining pin, and the remaining parts may be at least two components fixed relative to each other by the retaining pin.

One type of mechanical coupling between parts includes a spring-loaded ball, in a recess formed in the second part, that engages a dimple or depression formed in the first part. When the first part is inserted into a complementary shaped recess formed in the second part, the engagement of the ball of the second part in the dimple of the first part prevents relative movement between the two parts, and in particular may prevent the first part from slipping out of the recess in response to vibration of, or shock applied to, the first and/or second parts.

A disadvantage of this type of mechanical coupling is that it requires the formation of a bore in one part to receive the ball and spring for urging the ball from the bore, and the formation of a dimple or depression in the complementary part. Further, such a mechanical coupling may limit the ability of the second part to be oriented in multiple positions relative to the first part. Moreover, the amount of retaining force a ball-and-dimple mechanism can provide may be limited.

Another type of mechanical coupling includes a set screw, which may be threaded through the second part to engage and retain the first part when the first part is placed within a void or recess in the second part. The set screw contacts the first part in order to retain the first part within the void of the second part. A disadvantage of using a set screw is that shock and/or external vibration may gradually work the set screw loose and the first part may become decoupled from the second part. In some applications, the first part may include a depression to receive an inner end of the set screw. This also may limit the ability of the second part to be oriented in multiple positions relative to the first part. Furthermore, the set screw of the second part may tend to damage the surface of the first part. In addition, the retaining force delivered by the set screw may be insufficient.

Yet another type of a mechanical coupling is an interference-fit coupling between parts. In any interference-fit coupling, the shank is slightly larger than the receiver before the coupling is made. One form of an interference fit is a shrink fit, in which, to compensate for the size difference between the shank of the first part and the receiving opening of the second part, the material surrounding the receiving opening in the second part is heated, and/or the complementary shaped shank of the first part is chilled prior to insertion thereof into the receiving opening. Normalization of the temperature of the first and/or second parts creates an interference fit between the parts. Another type of interference-fit coupling is a press fit, in which the size of the opening of the second part is slightly less than the size of the shank or insertion portion of the first part. The shank is then forced into the opening, which causes the opening to expand slightly and/or the shank to compress slightly. In the case of an interference fit, such as a shrink fit or a press fit, the inherent elasticity of the materials making up the first and the second parts provides the normal forces and the resulting frictional forces, causing the two parts to engage each other.

An example of the use of such interference fits is an end mill that is retained within a tool holder. By providing an interference-fit mechanical coupling, the cylindrical body of the shank of the tool may be retained within the tool holder in a variety of orientations.

However, an-interference-fit coupling may be susceptible to loosening when subjected to shock or vibration. For example, since frictional forces are produced only due to the inherent elasticity of the parts, which is purely a material property, vibrational forces, especially those directed normal to the axis of the shank, create directional elastic deformation of both interfering surfaces (e.g., the surface of the shank and the wall of the hole or recess within the tool holder). When there is an axial component to the force acting on the shank, corresponding points of the external surface of the shank and the inner wall of the recess may lose contact with one another and the tool may effectively "walk" out of the recess in the tool holder, as the directional elastic deformation progresses about the circumference of the shank.

SUMMARY

Accordingly, there is a need for a secure mechanical coupling between parts or surfaces thereof that does not require additional components to effect the mechanical coupling, and is capable of remaining secure when exposed to shock or vibrational forces.

One aspect of the present disclosure relates to a coupling between a first surface and a second surface. The first surface includes a first shape and has a surface roughness average that is less than or equal to about 500 microinches (13 microns). The second surface includes a second shape and projections, in a preselected pattern, forming at least a portion of the second surface. The first shape of the first surface and the second shape of the second surface are substantially complementary. The projections are configured to produce a friction fit between the first surface and the second surface when the first and the second surfaces are biased against each other. An average elastic compressive range, substantially equal to the surface roughness average of the first surface, is associated with the projections. A force biasing the first and the second surfaces against each other is either sufficient to reach or exceed the average elastic compressive range of the projections or, is greater than zero, but is insufficient to exceed the average elastic compressive range of the projections.

Another aspect of the present disclosure relates to a coupling between a first part and a second part. The coupling includes a first surface of the first part, wherein the first surface has a first shape and a surface roughness average that is less than or equal to about 500 microinches (13 microns); a second surface of the second part, wherein the second surface has a second shape, the first and the second shapes being substantially complementary; and projections that form at least a portion of the second surface in a preselected pattern. The projections are configured to produce a friction fit between the first surface and the second surface when the first and the second surfaces are biased against each other. The projections have an average elastic compressive range substantially equal to the surface roughness average of the first surface. A force biasing the first and second surfaces against each other is either sufficient to reach or exceed the average elastic compressive range of the projections or, is greater than zero, but is insufficient to exceed the average elastic compressive range of the projections.

Yet another aspect of the present disclosure relates to a method of forming a coupling between a first part and a second part. The method includes providing a first surface of the first part, wherein the first surface has a first shape and a surface roughness average that is less than or equal to about 500 microinches (13 microns); forming a second surface of the second part, the second surface having a second shape, the first and the second shapes being substantially complementary, wherein projections, forming at least a portion of the second surface in a preselected pattern, are configured to produce a friction fit between the first surface and the second surface when the first and the second surfaces are biased against each other; and biasing the first and the second surfaces against each other. The projections have an average elastic compressive range substantially equal to the surface roughness average of the first surface. A force biasing the first and the second surfaces against each other is either sufficient to reach or exceed the average elastic compressive range of the projections or is greater than zero, but is insufficient to exceed the average elastic compressive range of the projections.

Still another aspect of the present disclosure relates to a method of at least partially forming a second part for a coupling between a first part and the second part. The first part includes a first surface having a first shape and a surface roughness average that is less than or equal to about 500 microinches (13 microns). The method includes forming a second surface of the second part, the second surface having a second shape, the first and the second shapes being substantially complementary, wherein projections, forming at least a portion of the second surface in a preselected pattern, are configured to produce a friction fit between the first surface and the second surface when the first surface and the second surface are biased against each other. The projections have an average elastic compressive range substantially equal to the surface roughness average of the first surface.

Still yet another aspect of the present disclosure relates to a method of forming a second surface for coupling with a first surface having a first shape and a surface roughness average that is less than or equal to about 500 microinches (13 microns). The method includes forming a second surface having a second shape, the first and the second shapes being substantially complementary, wherein projections, forming at least a portion of the second surface in a preselected pattern, are configured to produce a friction fit between the first surface and the second surface when the first and the second surfaces are biased against each other. An average elastic compressive range, substantially equal to the surface roughness average of the first surface, is associated with the projections.

A further aspect of the present disclosure relates to a method of forming a coupling between a first surface and a second surface. The method includes providing the first surface that has a first shape and a surface roughness average that is less than or equal to about 500 microinches (13 microns); forming the second surface that includes a second shape, the first and the second shapes being substantially complementary, and also includes projections, forming at least a portion of the second surface in a preselected pattern; and biasing the first surface and the second surface against each other with a force. The preselected pattern is configured to produce a friction fit between the first surface and the second surface when the first and the second surfaces are biased against each other. An average elastic compressive range, substantially equal to the surface roughness average of the first surface, is associated with the projections. A force biasing the first and the second surfaces against each other is either sufficient to reach or exceed the average elastic compressive range of the projections or, is greater than zero, but is insufficient to exceed the average elastic compressive range of the projections.

Other features of the disclosed frictional coupling will be apparent from the following description, the accompanying drawings, and the appended claims.

DETAILED DESCRIPTION

Figure 1:
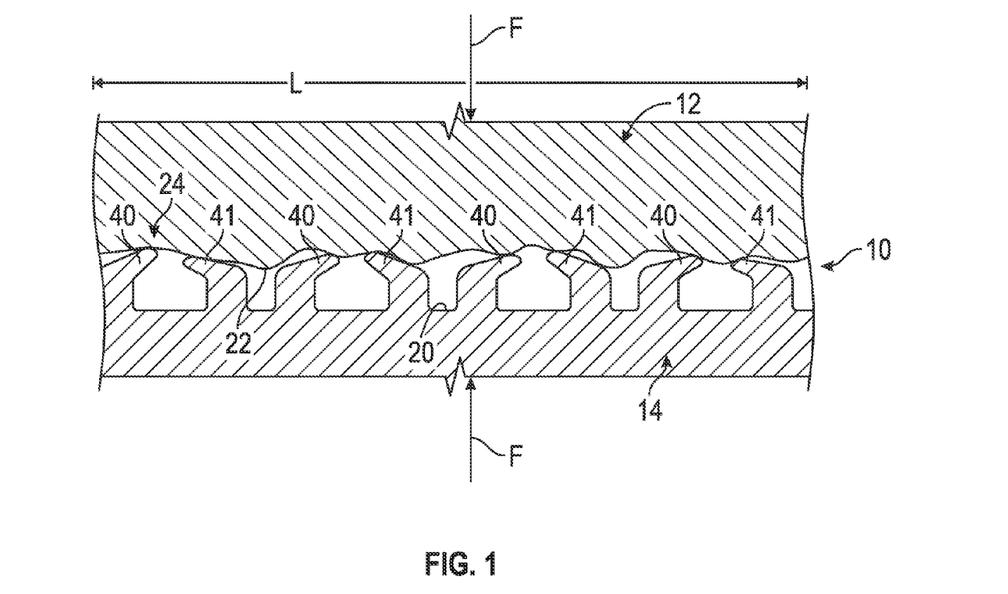
FIG. 1 is a schematic detail view of an example of the disclosed frictional coupling between a first part and a second part, showing an isotropic surface.

As shown in FIG. 1, a frictional coupling, generally designated 10, may be between a first part 12 and a second part 14. The first part 12 may include a surface, e.g., a first surface 22, having a shape (a first shape), and a surface roughness average (a first surface roughness average $R_{a1}$) that is less than or equal to about 500 microinches (13 microns). In one example, $R_{a1}$ may be less than or equal to about 250 microinches (6 microns), in another example less than or equal to about 125 microinches (3 microns), in a further example less than or equal to about 63 microinches (1.6 microns), in a further example less than or equal to about 32 microinches (0.8 microns), in a further example less than or equal to 16 microinches (0.4 microns), and in yet a further example less than or equal to about 8 microinches (0.2 microns). As used herein, a surface roughness average is the average deviation of a surface profile having a length L from a mean line.

The second part 14 may include a surface, e.g., a second surface 20. The shape of the first surface 22 (the first shape) and the shape of the second surface 20 (the second shape) are substantially complementary shapes. In one example, the first surface 20 and the second surface 22 may be substantially planar. In another example, the first surface 20 and the second surface 22 may be substantially non-planar, e.g., spherical, cylindrical, etc.

The second part 14 may include projections, e.g., projections 40 and projections 41, arranged in a preselected pattern 24 that forms at least a portion of the second surface 20. The projections 40, 41 may have a predefined shape, including, e.g., a taper in thickness and/or undercut surfaces. Such predefined shape provides the projections 40, 41 with a geometrically derived elasticity. As used herein, geometrically derived elasticity is a geometry-driven property of a body that enables the body to resume its original shape or size when a distorting force is removed. In one example, the projections 40, 41 may extend at an oblique angle or angles from the surface 20. As shown in FIG. 1, in an exemplary aspect of the disclosure, the projections 40 and 41 may extend away from the first surface 20 in a mutually convergent manner. Accordingly, the projections 40, 41 may produce an isotropic friction fit between the first surface 22 and the second surface 20, as observed in the two-dimensional view of FIG. 1.

As used herein, substantially complementary shapes are shapes whose geometric similarity is sufficient to ensure contact between the first surface 22 and the projections 40, 41 of the second surface 20.

Each of the projections 40, 41 may have an elastic compressive range, wherein the projections 40, 41 may have an average elastic compressive range (AECR) for a given length L of the surface profile. The AECR will be discussed in further detail below.

In one example, the projections 40, 41 may be evenly distributed along the second surface 20. In one aspect of the disclosure, the projections 40, 41 may have a height of less than or equal to about 0.0010 inches (25 microns). In another example, at least some of the projections 40, 41 are consubstantially derived from the material comprising the second surface 20. In yet another example, projections 40, 41 are not consubstantially derived from the second surface 20, i.e., the projections may be formed from a material different than that of the second surface and may be applied, as by sputtering or other well-known means, to the second surface. The projections 40, 41 may be formed using a variety of well-known methods, including the use of lithographically applied photo-resist and chemical machining, laser etching, embossing tools, equipment similar to thread-rolling machinery, as well as additive processes, such as 3D printing. The aforementioned forming methods may be employed to provide a preset grouping configuration or arrangement of projections 40, 41 (i.e., a preselected pattern thereof), such as a pattern of evenly spaced projections 40, 41 and/or projections that are unevenly spaced.

When the first part 12 and the second part 14 are subjected to a biasing force F, which includes opposing forces mutually biasing the first part 12 and the second part 14, the projections 40, 41 may be elastically deformed (i.e., bent) by the first surface 22. The ease of elastic deformation of the projections in response to the biasing force F varies based on the chosen geometric shape or shapes of the projections 40, 41. This elastic deformation creates a coupling between the first part 12 and the second part 14 responsive to the application of the biasing force F. In one example, the biasing force F and the resulting coupling may be based on either a locational interference fit or a force (shrink) fit. As used herein, a locational interference (press) fit may be a fit with small interferences designed for fixed couplings where precision and rigidity of fits of the coupled parts is the main requirement. Press fits cannot be used to transfer torsional moments using friction forces only; the parts 12, 14 must be secured to prevent one moving against the other. As used herein, the force (shrink) fit may be a fit with guaranteed interferences designed for fixed (undetachable) coupling of parts 12, 14 (e.g., permanent couplings of gears with shafts, bearing bushings, flanges, etc.). These fits are designed, for example, to transfer torsional moments using friction forces.

In one example, the materials for the first and second parts 12, 14 and the shapes of the projections 40, 41 are selected such that the average elastic compressive range (AECR) of the projections, e.g., the projections 40, 41, may be approximately equal to the surface roughness average $R_{a1}$ of the first surface 22. In one example, the force F, mutually biasing the first surface 22 and the second surface 20, may be sufficient to reach or exceed the AECR of the projections 40, 41. In another example, the force F biasing the first surface 22 and the second surface 20 against each other may be greater than zero, but may be insufficient to exceed the AECR for the projections, e.g., the projections 40, 41. In one example, the second surface 20 may have a second surface roughness average $R_{a2}$, which is sufficiently low to satisfy a fatigue-life requirement for the second part 14. In one aspect of the disclosure, the second surface 20 may have an $R_{a2}$ equal to or less than 125 microinches (3 microns). In the example of FIG. 1, since the pattern 24 of the projections 40, 41 is isotropic, as observed in the schematic two-dimensional view of FIG. 1, the friction fit between the surfaces 22, 20, resulting from the application of the biasing force F to the first part 12 and the second part 14, is an isotropic friction fit capable of resisting movement of the first surface 22 relative to the second surface 20 in the plane of FIG. 1. From the foregoing, those skilled in the art will appreciate that appropriately oriented additional projections may produce an isotropic friction fit between the first and second surfaces 22, 20, which is capable of resisting relative movement of the first surface and the second surface in any direction generally along the first surface.

As shown in FIG. 1, the elastic deformation of the projections 40, 41 may be generally perpendicular to the surface 22 of the second part 12. The projections 40, 41 also may elastically deform in the direction parallel to the surface 22.

Figure 2:
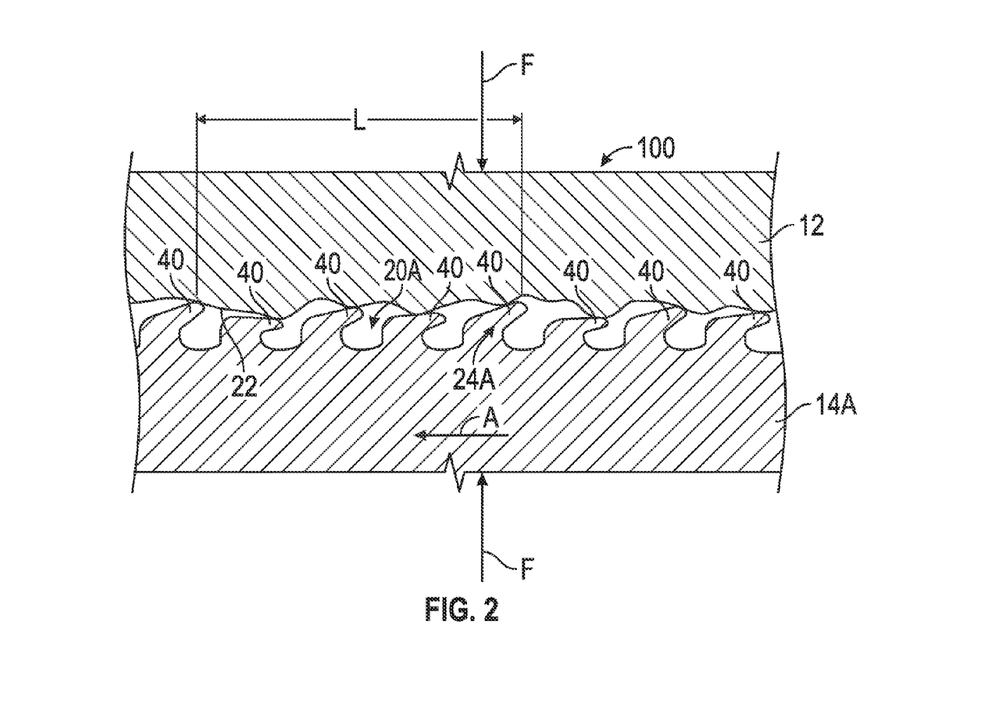
FIG. 2 is a schematic detail view of another example of the disclosed frictional coupling, showing an anisotropic surface.

As shown in FIG. 2, an example of the disclosed frictional coupling, generally designated 100, may include a first part 12 and a second part 14A that differs from the first part 14 of FIG. 1 in that the second part 14A may include only projections 40. Thus, a preselected pattern 24A of projections 40, forming at least a portion of the surface of the second part 14A, i.e., the second surface 20A, may be anisotropic. Accordingly, when the force F is applied to mutually bias the first part 12 and the second part 14A, an anisotropic friction fit between the parts 12 and 14A may be produced. The anisotropic friction fit between the first surface 12 and the second surface 14A may be configured to resist relative movement thereof in response to a force directed to produce such movement.

In one example, the average elastic compressive range of the projections 40 may be substantially equal to the surface roughness average $R_{a1}$ of the first part 12. In one example, the biasing force F that may urge the first part 12 and the second part 14A together to produce a friction fit between the parts may be selected to be sufficient to deflect the projections 40 to reach or exceed the average elastic compressive range of the projections. In one example, the force F selected to bias the first surface 12 and the second surface 14A is greater than zero, but is insufficient to exceed the average elastic compressive range.

The shape and orientation of the projections 40 cause the anisotropic surface pattern 24A to oppose movement of the second part 14A relative to the first part 12 in a direction opposite to the direction of arrow A in FIG. 2 when the biasing force F is applied. Conversely, the shape and orientation of the projections 40 comprising the anisotropic surface pattern 24A allow slippage of the second part 14A relative to the first part 12 in the direction of arrow A in FIG. 2.

Figure 3:
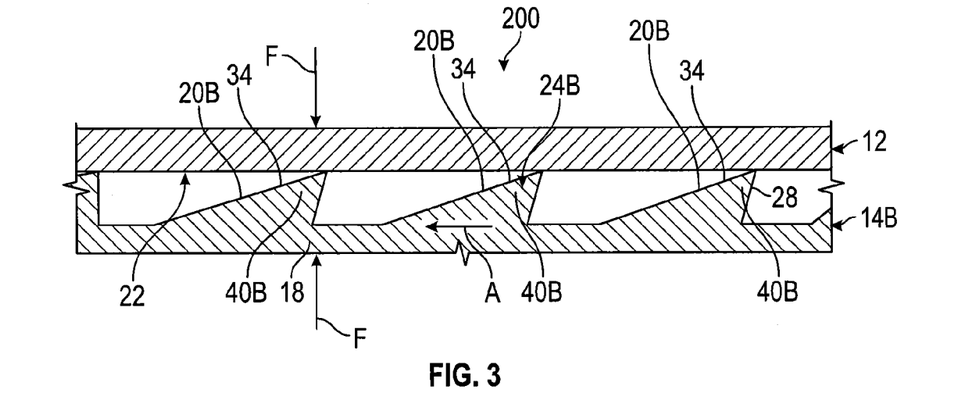
FIG. 3 is a schematic detail view of yet another example of the disclosed frictional coupling.

As shown in FIG. 3, another example of the disclosed frictional coupling, generally designated 200, may be between a first part 12 and a second part 14B having projections 40B. The projections 40B may be arranged in a preselected pattern 24B that may be an anisotropic pattern. The first part 12 may include a first surface 22 having a shape (a first shape) and a surface roughness (a first surface roughness average $R_{a1}$). The second part 14B may include a second surface 20B having a shape (a second shape) and a surface roughness average (a second surface roughness average $R_{a2}$). The first shape and the second shape are substantially complementary shapes.

The pattern 24B may be a preselected pattern that forms at least a portion of the second surface 20B. In one example, the projections 40B of preselected pattern 24B may be configured to produce an anisotropic friction fit between the first surface 22 and the second surface 20B when the first surface and the second surface are biased against each other by a force F.

The projections 40B of the preselected surface pattern 24B may include a first portion 28 that extends in a direction oblique to the surface 22, and a second portion 34 that extends obliquely from the first portion 28. The first portion 28 forms an undercut surface on each of the projections 40B. This undercut is maintained as the first surface 22 and second surface 20B are biased against each other by force F. The first portion 28 may face in a direction opposite the direction of the arrow A in FIG. 3.

The first portions 28 and second portions 34 collectively may form a pattern 24B of projections 40B in cross section. In one example, the length of the individual projection 40B may be 0.0030 inches (76 microns), measured in a general direction along the surface 22.

As shown in FIG. 3, the anisotropic surface pattern 24B of the second part 14B may engage the surface 22 of the first part 12 at the intersection of the first and second portions 28, 34 of projections 40B. The shape of the projections 40B of the anisotropic surface pattern 24B may facilitate movement of the second part 14B relative to the first part 12 in the direction of arrow A, but resist relative movement in the opposite direction.

In one example, the projections 40B may be shaped such that the height of the first portions 28, measured in a direction substantially normal to the first surface 22, may be approximately 0.0010 inches (25 microns), the length of the second portion 34 may be approximately 0.0040 inches (101 microns), measured in a direction along the first surface 22. The dimensions may have tolerances of plus or minus 0.0005 inches (13 microns).

Figure 4:
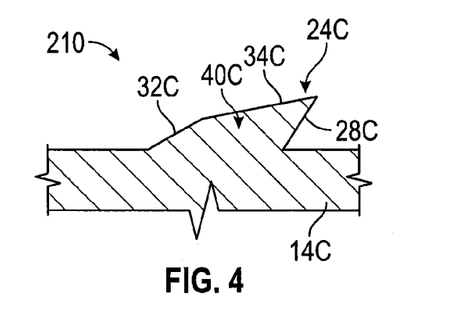
FIG. 4 is a schematic detail view of still yet another example of the disclosed frictional coupling.

Another example of the frictional coupling 210 is shown in FIG. 4. In this example, the second part 14C may have projections 40C with a first undercut portion 28C, a second portion 34C extending from the first portion, and a third portion 32C extending from the second portion.

Figure 5:
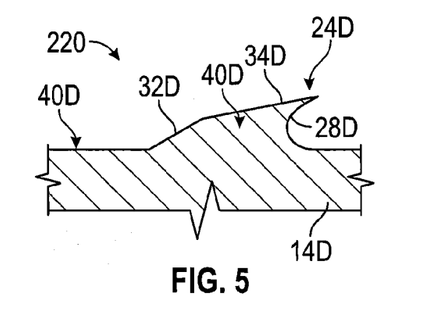
FIG. 5 is a schematic detail view of still another example of the disclosed frictional coupling.

As shown in FIG. 5, in another example of the frictional coupling, generally designated 220, the second part 14D may include projections 40D, each having a first portion 28D, a second portion 34D extending from the first portion, and a third portion 32D extending from the second portion. The first portion 28D may include an undercut surface that is non-planar. This non-planar shape may reduce stress concentrations and fatigue failure of the projections 40D.

Figure 6:
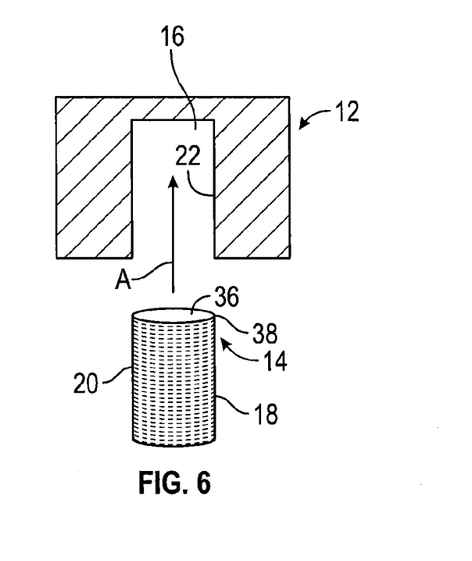
FIG. 6 is a schematic representation of an example of an application of the disclosed frictional coupling.

In another example, shown in FIG. 6, the frictional coupling, generally designated 100 in FIG. 2, 200 in FIG. 3, 210 in FIGS. 4 and 220 in FIG. 5, may be used to secure a second part 14, which in FIG. 6 may be in the form of a tool (e.g., an end mill) to a first part 12, which in one example may be a tool holder or receiver. The opposing surfaces of the coupling 100 may be biased (urged) together with the use a friction fit in the form of, e.g., a shrink fit or a press fit.

The receiver 12 may include a cylindrical recess 16 that may be shaped to receive a cylindrical shank 18 of the tool 14 with an interference fit, wherein the inside diameter of the cylindrical recess 16 may be slightly less than the outside diameter of the shank 18 before the coupling is effected. When, the shank 18 is, e.g., press fit into the recess 16 in the direction of arrow A, the external surface 20 (i.e., the second surface 20) of the shank 18 may engage the cylindrical wall 22 (i.e., the first surface 22) of the cylindrical recess 16. In one example, the tool 14 and the receiver 12 may be made of steel or other metals or metallic alloys. In other examples, the coupling 100 may be between first and second parts 12, 14 made of ceramics, glasses, powdered metals, sintered metals, or combinations of the foregoing. In a particular example, the tool 14 may be made of tungsten carbide or a high-carbon tool steel, and the receiver 12 may be made of steel, such as a mild steel.

The press fit between the shank 18 and the cylindrical recess 16 of the receiver 12 provides a friction force that causes the receiver to grip the shank securely under static loading. Higher normal forces of the tool holder upon the shank, such as the ones provided by a shrink fit, may increase the elastic deformation of the projections and improve the grip of the receiver 12 upon the tool shank 18. The more projections (contact points) between the external surface 20 of the shank 18 and the inner wall 22 of the cylindrical recess 16 that remain engaged at the same time due to local elastic deformation of the projections, the less susceptible the coupling 10 may be to unintended disassembly. In one example, the end 36 of the shank 18 may be chamfered at 38 to facilitate insertion of the shank 18 into the recess 16 of the receiver 12.

The preselected surface pattern, e.g., anisotropic pattern 24B on the surface of the shank 18, may take the form of a plurality of annular projections 40 shown in FIG. 2, 40B shown in FIG. 3, 40C in FIG. 4, or 40D in FIG. 5, or combinations thereof. In one or more aspects of the disclosure, the projections 40 may be one of continuously formed or segmented, or combinations thereof. This anisotropic shape of the projections 40, for example, may facilitate the movement of the shank 18 further into the recess 16 in the direction of arrow A, and resists movement of the shank 18 in the opposite direction, namely, outwardly from the recess in a direction opposite arrow A. By introducing a localized, weakened surface structure via an anisotropic surface pattern, e.g., the preselected pattern 24B, more contact points may be realized through elastic deformation of, e.g., the projections 40B the surface pattern 24B. This surface configuration may operate to prevent the "walk out" phenomenon, in which vibration sustained by the shank 18 and/or the holder 12 may cause the shank to move in a direction opposite arrow A out of the recess 16. If the axial component of the external force, which may be associated with vibrations or shock loads, happens to be bi-directional (i.e., both pushing and pulling the shank 18), the coupling 10 is thus tailored to favor assembly (i.e., insertion of the shank 18 into the recess 16) rather than disassembly.

While the projections, e.g., projections 40 of FIG. 2, are shown formed in an annular shape and arranged parallel to each other along the length of the shank 18 of the tool 14 in the example of FIG. 6, the projections may be formed on the shank 18 in other orientations, e.g., an orientation that may be oblique relative to the longitudinal symmetry axis of the shank 18. Moreover, the projections may be formed as a continuous helical feature, or in discontinous segments of parallel annular projections or helical projections, as described with reference to FIG. 12, infra. In other examples, the preselected pattern of projections may not be parallel or helical, but may intersect itself, forming, e.g., a cross-hatch pattern.

Figure 8:
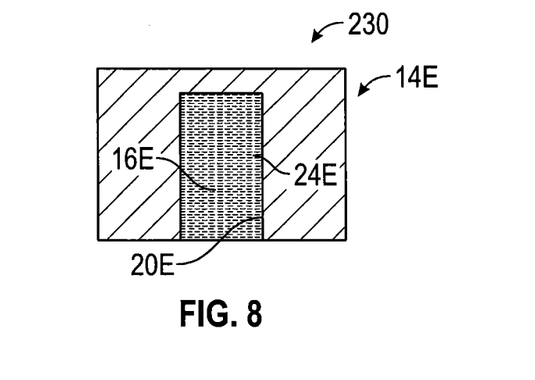
FIG. 8 is a schematic representation of a variation of the example of FIG. 6.

In one example shown in FIG. 8, the frictional coupling, generally designated 230, may include a first part 14E in the form of a tool receiver having a recess 16E with a surface 22E that may include a surface pattern 24E in the form of projections 20E similar in shape to one or more of the surface patterns 24A of FIG. 2, 24B of FIG. 3, 24C of FIG. 4 or 24D of FIG. 5, shaped to provide an anisotropic friction fit. The surface pattern 24E is oriented in a direction opposite that of the surface pattern 24B in FIG. 3, since the surface pattern 24E is formed on a wall 20E of the receiver 14E for retaining a tool similar to tool 14 of FIG. 6, but with a substantially smooth surface without a preselected pattern thereon.

Figure 7:
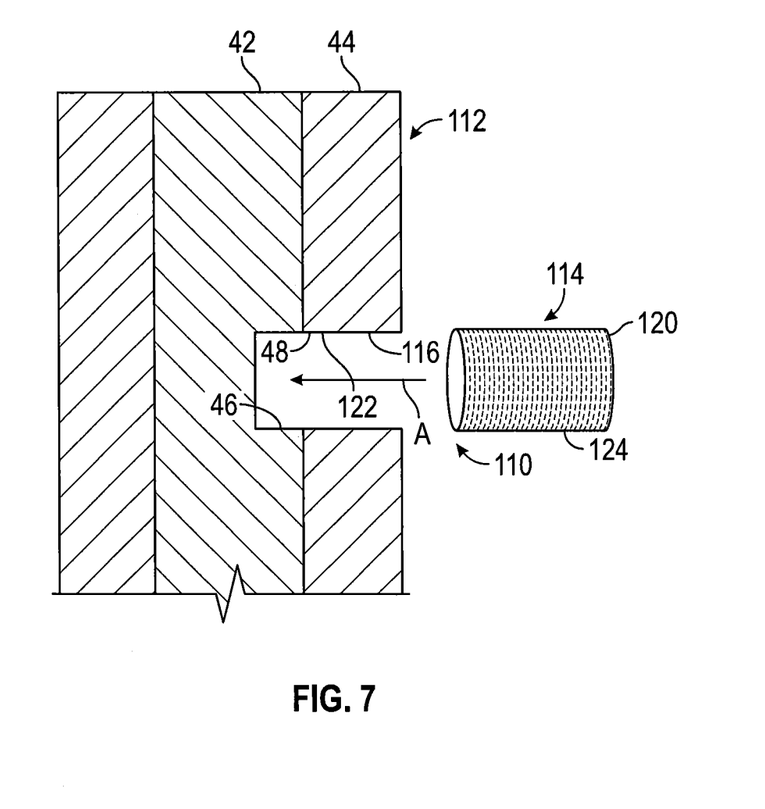
FIG. 7 is schematic representation of an example of another application of the disclosed frictional coupling.

As shown in FIG. 7, in one example, the frictional coupling 110 may include a first part in the form of a receiver 112 having a recess 116, and a second part in the form of a shank, for example a pin 114 that is shaped to engage the recess 116. The first part 112 may include at least two components 42, 44, respectively (e.g., a stack of parts), coupled by the pin 114. In one example, component 42 may include an inner portion 46 of the recess 116 and the component 44 may include an outer portion 48 of the recess. The portions 46, 48 may combine to form the recess 116 that is shaped to receive the pin 114. In one or more aspects of the disclosure, there may exist a plurality of adjacently stacked portions or components of the first part 112, through which the recess 116 is formed to receive the pin 114 for joining the components.

The pin 114 may include an anisotropic surface pattern 124 on all or a portion of its outer surface 120. The projections of the anisotropic surface pattern 124 may be shaped as shown in one or more of FIGS. 2, 3, 4 and 5. These projections may be configured and oriented to promote the retention of the pin 114 within the recess 116, such that external vibration may cause the pin 114 to travel in the direction of the arrow A, which in the example of FIG. 7 may urge the pin further into the recess 116 and to resist slippage of the pin 114 in the opposite direction, namely, out of the recess. In one example, the anisotropic surface 124 may be formed on an inner surface 122 of the recess 116, as in the example of FIG. 8, and the surface of the pin 112 may be smooth. In such an example, the orientation of projections 40 may be reversed from that shown in FIGS. 2, 3, 4, and 5. Alternatively, the preselected surface pattern 124 may be an isotropic pattern, such as that described with reference to FIG. 1, especially where the recess 116 is a through, rather than a blind, recess (not shown).

A method of forming a frictional coupling, such as couplings 10, 100, 200, 210, 220, 230 between two or more parts may include providing the first part 12, which may, for example, be a receiver, and providing the second part 14, which may, for example be a shank or a pin. The first part may have a surface, which may be the surface 22 of the recess 16 of FIG. 6 or the surface 122 of the recess 116 of FIG. 7, shaped to engage the surfaces 20, 120 of the shank 18 and the pin 114, respectively, with, e.g., an anisotropic interference fit. Patterns 24, 124 may be formed on the outer surfaces 20, 120 of the shank 18 and pin 114, respectively, using one or more of the methods mentioned previously. The first part, which may be the shank 18 or the pin 114, then may be inserted into the recesses 16, 116 of the second part, which may be the tool holder 12 or the second part 112, respectively, with an anisotropic interference fit, such that the surface pattern 24, 124 is biased against the surface 22, 122 of the second part 12, 112 as a result of the interference fit between the two parts.

In response to vibration experienced by the first part 12, 112 and/or second part 14, 114, or the motion of the first part relative to the second part, the surfaces 20, 120 may provide directional slippage to promote engagement of the first and second parts. The engagement may result because the orientation of the anisotropic surfaces 24, 124 produces slippage of the second parts 14, 114 into the recesses 16, 116, respectively, rather than out of the recesses. The vibration experienced by the coupling may be a result of sonic vibration forces, ultrasonic vibration forces, and/or shock forces. Assuming the second part 14, 114 is held stationary, the forces acting on the first part 12, 112 may be in a longitudinal direction along arrow B (see FIG. 9) or in a circumferential direction in the direction of arrow C. The coupling, e.g., the coupling 100, 200 also may provide engagement slippage in response to cycles of heating and cooling of the first and/or second parts.

The disclosed frictional couplings may be applicable to any mechanical interface where friction serves as a major contribution to interface integrity. In particular, such couplings may be used on cutters being held by any tool holder that relies upon hoop-stress retention of the cutter, such as shrink-fit tool holders, milling chucks, and hydraulic tool holders, without the need to provide additional components to effect the mechanical retention coupling. This design may enable higher performance capability from existing equipment without investment in new tool holders.

Figure 10:
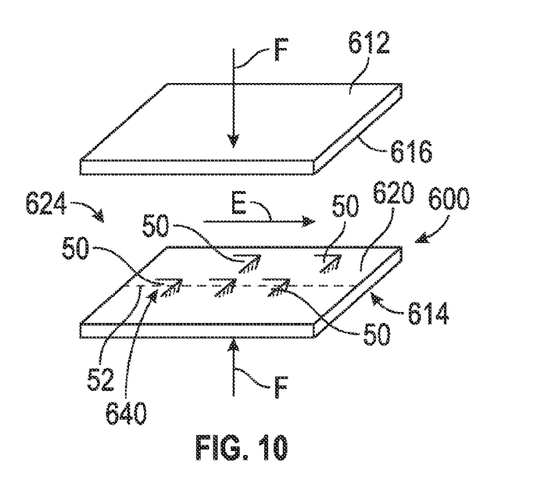
FIG. 10 is a schematic representation of an example of the disclosed frictional coupling associated with two planar surfaces.

Another example of the frictional coupling, generally designated 600, is shown in FIG. 10. In this example, the first part 612 may be in the form of a flat sheet or plate having a first surface 616, and the second part 614 may be in the form of a correspondingly shaped flat sheet or plate. The first part 612 may have a first surface 616, facing the second part 614, and the second part 614 may have a second surface 620, facing the first part. The second surface 620 of the second part 614 may have projections, and preferably a plurality 640 of discrete projections 50. The projections 50 are formed in a preselected pattern 624 on the second surface 620 and have a predefined shape, which imparts the projections with geometrically derived elasticity, as discussed above with respect to other aspects of the disclosure. Accordingly, the projections elastically deform responsive to a force F that mutually biases the first part 612 and the second part 614. For example, the projections 50 may include undercut surfaces and/or may have a cross-section that tapers in the direction of the first surface 116. As a result, the projections 50 may elastically deform in response to the biasing force F.

Figure 9:
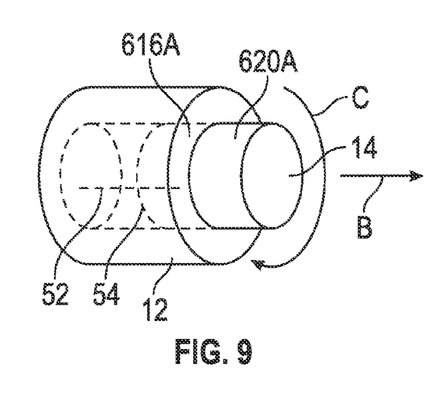
FIG. 9 is a schematic representation of another example of an application of the disclosed frictional coupling, showing a second part engaging a first part.

In one or more aspects of the disclosure, the first and second surfaces 616, 620, respectively, may be planar, or substantially planar, and in other examples the first and second surfaces 616A, 620A, respectively, may be non-planar or substantially non-planar, as shown in FIG. 9. Referring back to FIG. 10, assuming that the first part 612 is held stationary and the second part 614 is urged in the direction of arrow E, the projections 50 may be anisotropically oriented to oppose relative motion between the first and second surfaces 616, 620, respectively, when the first surface 616 and second surface 620 are mutually biased. Accordingly, the elastic deformation of the projections 50 may be in the direction of the force F as well as along a line 52 parallel to arrow E. In one or more aspects of the disclosure, the line 52 may be rectilinear (see also FIG. 9), and in other examples may be a curvilinear line 54. The anisotropic frictional properties of the projections 50 may be predetermined by the manner in which they are shaped, oriented, and/or arranged in the pattern 624. In other examples, the frictional properties of the projections may be isotropic.

Figure 11:
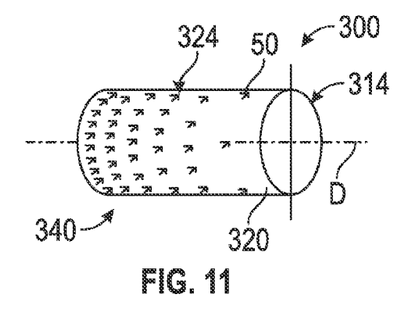
FIG. 11 is a schematic representation of a surface pattern of a frictional coupling according to one aspect of the disclosure.

In the example of the frictional coupling, generally designated 300 and shown in FIG. 11, the projections 50 may be formed on the first surface 320 of a cylindrically shaped second part 314, which is shaped to engage the recess 616A of the first part 12 shown in FIG. 9. In one example, the second part 314 may be a shank of a tool or other object. The projections 50 may be arranged in a pattern 324 that varies in the density of projections along an axis D of the second part 314 (e.g., decreasing in density of protrusions from left to right in FIG. 11). Further, the pattern 324 of projections 50 may be symmetric about the axis D. In other examples, the pattern 324 of projections 50 may be asymmetric, such as pattern 624 of projections 50 with respect to line 52 in FIG. 10.

Figure 12:
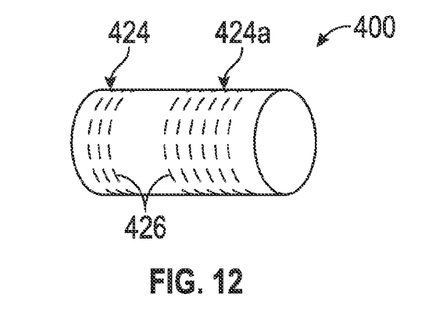
FIG. 12 is a schematic representation of a surface pattern of a frictional coupling according to another aspect of the disclosure.

In the example of the coupling, generally designated 400, shown in FIG. 12, the projections may take the form of segmented projections 426. The segmented projections 426 may have a profile similar to that of projections shown in one or more of FIGS. 2, 3, 4 and 5. The segmented projections 426 may be arranged in a plurality of patterns, such as patterns 424, 424A.

Figure 13:
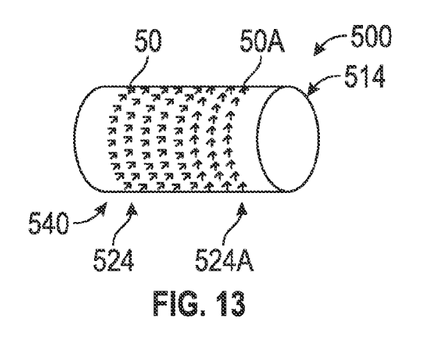
FIG. 13 is a schematic representation a surface pattern of a frictional coupling according to yet another aspect of the disclosure.

In the example of the coupling, generally designated 500, shown in FIG. 13, the second part 514 may have pluralities 540 of discrete projections 50, 50A, similar in shape to the projections of FIG. 10. These projections may be arranged in preselected patterns 524, 524A. The projections 50 in pattern 524 may be oriented to resist a combination of torsional and axial forces acting to separate the coupling. In other examples, additional preselected patterns of projections 50, 50A may be provided to resist loading in other directions. In one or more aspects of the disclosure, the projections of preselected pattern 524 may be interspersed with the projections of preselected pattern 524A.

Figure 14:
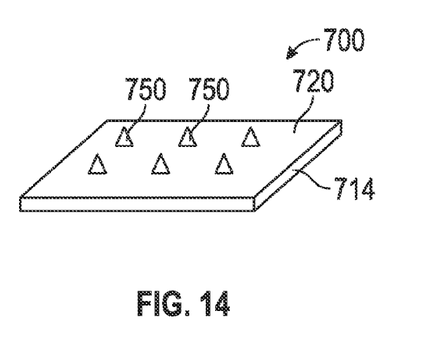
FIG. 14 is a schematic representation of a surface pattern of a frictional coupling according to still another aspect of the disclosure.

As shown in FIG. 14, in an example of the frictional coupling, generally designated 700, the surface 720 of the second part 714 may include a plurality of tapered projections 740 in the form of, e.g., discrete cones 750. Projections 740 also may take the form of pyramids, tapered cylinders, or the like, and extend substantially perpendicularly from the second surface 720. Projections 740 are not oriented obliquely to the surface 720. However, the projections 740 may be deflected to an orientation similar to that of projections 40 of FIG. 2 when the opposing surface of the frictional coupling are mutually biased by a force F.

While the forms of apparatus and methods herein described constitute exemplary aspects of the disclosure, it is to be understood that the disclosure is not limited to such forms of apparatus and methods, and that changes may be made therein without departing from the scope of disclosure.

What is claimed is:

1. A coupling between a first surface and a second surface, wherein:
   the first surface includes a first shape and a surface roughness average that is less than or equal to about 500 microinches (13 microns); and
   the second surface includes:
      a second shape, the first shape and the second shape being substantially complementary shapes, and
      projections, in a preselected pattern, forming at least a portion of the second surface, the projections having an average elastic compressive range substantially equal to the surface roughness average of the first surface, wherein the projections, in response to a constant force biasing the first surface and the second surface against each other, produce one of a locational interference fit or a shrink fit between the first surface and the second surface: and
   wherein the force biasing the first surface and the second surface against each other is greater than zero, but is insufficient to exceed the average elastic compressive range of the projections.

2. The coupling of claim 1, wherein the fit between the first surface and the second surface is an anisotropic friction fit.

3. The coupling of claim 2, wherein the anisotropic friction fit between the first surface and the second surface is configured to resist relative movement of the first surface and the second surface in response to a force applied to at least one of the first surface and the second surface in at least one direction along the first surface.

4. The coupling of claim 1, wherein the fit between the first surface and the second surface is an isotropic friction fit.

5. The coupling of claim 4, wherein the isotropic friction fit between the first surface and the second surface is configured to resist relative movement of the first surface and the second surface in response to a force applied to at least one of the first surface and the second surface in any direction along the first surface.

6. The coupling of claim 1, wherein the preselected pattern is substantially symmetric.

7. The coupling of claim 1, wherein each of the projections has a predefined shape that provides the projections with a geometrically derived elasticity.

8. The coupling of claim 1, wherein the preselected pattern includes at least one axis of symmetry.

9. The coupling of claim 1, wherein the preselected pattern is asymmetric.

10. The coupling of claim 1, wherein the surface roughness average is less than or equal to about 250 microinches (6 microns).

11. The coupling of claim 1, wherein the surface roughness average is less than or equal to about 125 microinches (3 microns).

12. The coupling of claim 1, wherein the surface roughness average is less than or equal to about 63 microinches (1.6 microns).

13. The coupling of claim 1, wherein the surface roughness average is less than or equal to about 32 microinches (0.8 microns).

14. The coupling of claim 1, wherein the surface roughness average is less than or equal to about 16 microinches (0.4 microns).

15. The coupling of claim 1, wherein the surface roughness average is less than or equal to about 8 microinches (0.2 microns).

16. The coupling of claim 1, wherein the first surface is on one of a shank and a receiver and the second surface is on the other one of the shank and the receiver.

17. The coupling of claim 16, wherein the preselected pattern is configured to facilitate engaging the shank with the receiver and to oppose disengaging the shank and the receiver.

18. The coupling of claim 1, wherein the projections are one of continuously formed and segmented.

19. The coupling of claim 18, wherein each of the projections includes a cross section having a first portion and a second portion extending from the first portion.

20. The coupling of claim 19, further including a third portion extending from the second portion.

21. The coupling of claim 19, wherein the first portion of the cross section of at least one of the projections includes an undercut surface when the first surface and the second surface are biased against each other.

22. The coupling of claim 21, wherein the undercut surface is non-planar.

23. The coupling of claim 1, wherein each of the projections has a height of less than or equal to about 0.0010 inches.

24. The coupling of claim 1, wherein the projections include a first plurality of projections and a second plurality of projections, the first plurality of projections being different from the second plurality of projections.

25. The coupling of claim 24, wherein the first plurality of projections is arranged in a first pattern, and the second plurality of projections is arranged in a second pattern, the second pattern being different from the first pattern.

26. The coupling of claim 25, wherein at least one of the first pattern and the second pattern is an ordered pattern.

27. The coupling of claim 25, wherein the second pattern is interspersed with the first pattern.

28. The coupling of claim 25, wherein at least one of the first pattern and the second pattern varies in density along the second surface.

29. The coupling of claim 1, wherein the first surface and the second surface are substantially planar.

30. The coupling of claim 1, wherein the first surface and the second surface are substantially non-planar.

31. The coupling of claim 1, wherein the projections are consubstantially derived from the at least a portion of the second surface.

32. The coupling of claim 1, wherein the projections are not consubstantially derived from the at least a portion of the second surface.

33. The coupling of claim 1, wherein the projections are evenly distributed along the second surface.

34. A coupling between a first part and a second part, the coupling comprising:
   a first surface of the first part, wherein the first surface has a first shape and a surface roughness average that is less than or equal to about 500 microinches (13 microns);
   a second surface of the second part, wherein the second surface has a second shape, the first shape and the second shape being substantially complementary shapes; and
   projections that form at least a portion of the second surface in a preselected pattern, the projections having an average elastic compressive range substantially equal to the surface roughness average, such that, in response to a constant force biasing the first surface and the second surface against each other, produce one of a locational interference fit or a shrink fit between the first surface and the second surface when the first surface and the second surface are biased against each other; and
   wherein the force biasing the first surface and the second surface against each other is greater than zero, but is insufficient to exceed the average elastic compressive range of the projections.

35. The coupling of claim 34, wherein the second surface has a surface roughness average equal to or less than 125 microinches (3 microns).

* * * * *